US012756660B2

(12) United States Patent
Liu et al.

(10) Patent No.: US 12,756,660 B2
(45) Date of Patent: Oct. 6, 2026

(54) SLICE INFORMATION VERIFICATION METHOD AND APPARATUS

(71) Applicant: ZTE Corporation, Shenzhen (CN)

(72) Inventors: Yao Liu, Shenzhen (CN); Shaofu Peng, Shenzhen (CN); Ran Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/864,100

(22) PCT Filed: Jan. 17, 2023

(86) PCT No.: PCT/CN2023/072696
§ 371 (c)(1),
(2) Date: Nov. 8, 2024

(87) PCT Pub. No.: WO2023/236544
PCT Pub. Date: Dec. 14, 2023

(65) Prior Publication Data
US 2025/0317387 A1 Oct. 9, 2025

(30) Foreign Application Priority Data
Jun. 10, 2022 (CN) ......................... 202210658976.2

(51) Int. Cl.
*H04L 45/50* (2022.01)
*H04L 41/0869* (2022.01)

(52) U.S. Cl.
CPC ........ *H04L 45/507* (2013.01); *H04L 41/0869* (2013.01)

(58) Field of Classification Search
CPC ... H04L 45/507; H04L 41/0869; H04L 43/10; H04L 45/34; H04L 45/50; H04L 45/00; H04L 43/08; H04L 41/0893
See application file for complete search history.

(56) References Cited

U.S. PATENT DOCUMENTS 7,940,695 B1 * 5/2011 Bahadur ................ H04L 45/28 370/254
10,764,175 B1 9/2020 Filsfils et al.
(Continued)

FOREIGN PATENT DOCUMENTS

CN 110266594 A 9/2019
CN 112311673 A 2/2021
(Continued)

OTHER PUBLICATIONS

European Search Report for Application No. 23818712.4, dated Jul. 23, 2025, 10 pages.
(Continued)

*Primary Examiner* — Benjamin M Thieu
(74) *Attorney, Agent, or Firm* — CANTOR COLBURN LLP

(57) ABSTRACT

Provided are a method and an apparatus for verifying slicing information. A first message is sent by means of an initiation node, and slicing information to-be-verified is carried in the first message, such that whether the slicing information carried in the first message is consistent with local information of can be verified by the receiving node.

15 Claims, 9 Drawing Sheets

(56) References Cited

U.S. PATENT DOCUMENTS

| | | | | |
|---|---|---|---|---|
| 2010/0238812 | A1* | 9/2010 | Boutros | H04L 43/50 370/389 |
| 2018/0026880 | A1* | 1/2018 | Nainar | H04L 45/50 370/389 |
| 2021/0092037 | A1* | 3/2021 | Rathi | H04L 45/26 |
| 2021/0111995 | A1* | 4/2021 | Arora | H04L 45/20 |
| 2021/0153079 | A1 | 5/2021 | Hu et al. | |
| 2022/0141095 | A1 | 5/2022 | Beeram et al. | |
| 2022/0174004 | A1 | 6/2022 | Filsfils et al. | |
| 2023/0155906 | A1* | 5/2023 | Xie | H04L 45/34 370/252 |

FOREIGN PATENT DOCUMENTS

| | | |
|---|---|---|
| CN | 112995030 A | 6/2021 |
| CN | 113411258 A | 9/2021 |

OTHER PUBLICATIONS

International Search Report for corresponding application PCT/CN2023/072696 filed Jan. 17, 2023; Mail date Apr. 26, 2023.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        Version Number         |          Global Flags         |
+-+-+-+-+-+-+-+-+-+-+-+-+-+-+-+-+-+-+-+-+-+-+-+-+-+-+-+-+-+-+-+-+
| Message Type  |  Reply Mode   |  Return Code  | Return Subcode|
+-+-+-+-+-+-+-+-+-+-+-+-+-+-+-+-+-+-+-+-+-+-+-+-+-+-+-+-+-+-+-+-+
|                        Sender's Handle                        |
+-+-+-+-+-+-+-+-+-+-+-+-+-+-+-+-+-+-+-+-+-+-+-+-+-+-+-+-+-+-+-+-+
|                        Sequence Number                        |
+-+-+-+-+-+-+-+-+-+-+-+-+-+-+-+-+-+-+-+-+-+-+-+-+-+-+-+-+-+-+-+-+
|                    TimeStamp Sent (seconds)                   |
+-+-+-+-+-+-+-+-+-+-+-+-+-+-+-+-+-+-+-+-+-+-+-+-+-+-+-+-+-+-+-+-+
|               TimeStamp Sent (seconds fraction)               |
+-+-+-+-+-+-+-+-+-+-+-+-+-+-+-+-+-+-+-+-+-+-+-+-+-+-+-+-+-+-+-+-+
|                  TimeStamp Received (seconds)                 |
+-+-+-+-+-+-+-+-+-+-+-+-+-+-+-+-+-+-+-+-+-+-+-+-+-+-+-+-+-+-+-+-+
|             TimeStamp Received (seconds fraction)             |
+-+-+-+-+-+-+-+-+-+-+-+-+-+-+-+-+-+-+-+-+-+-+-+-+-+-+-+-+-+-+-+-+
|                            TLVs ...                           |
.                                                               .
.                                                               .
.                                                               .
|                                                               |
+-+-+-+-+-+-+-+-+-+-+-+-+-+-+-+-+-+-+-+-+-+-+-+-+-+-+-+-+-+-+-+-+
```

Fig. 11

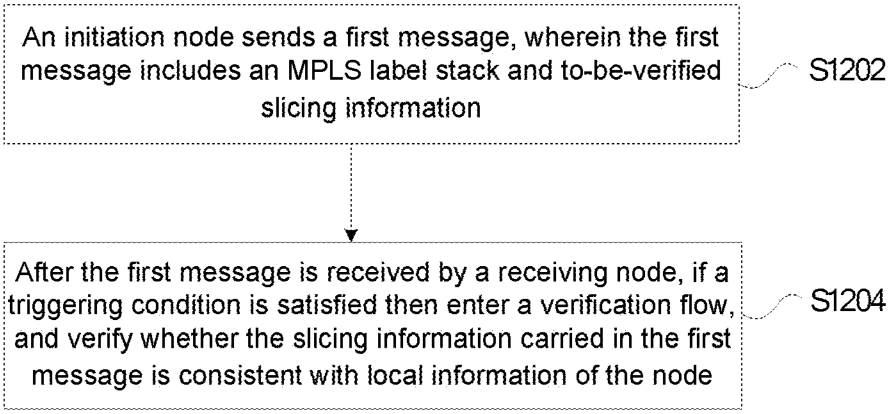

Fig. 12

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                          IPv4 Prefix                          |
+-+-+-+-+-+-+-+-+-+-+-+-+-+-+-+-+-+-+-+-+-+-+-+-+-+-+-+-+-+-+-+-+
|Prefix Length  |    Protocol   |          Slice ID             |
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                                                               |
|                          IPv6 Prefix                          |
|                                                               |
|                                                               |
+-+-+-+-+-+-+-+-+-+-+-+-+-+-+-+-+-+-+-+-+-+-+-+-+-+-+-+-+-+-+-+-+
|Prefix Length  |    Protocol   |               Slice ID        |
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Adj. Type   |    Protocol   |            Slice ID           |
+-+-+-+-+-+-+-+-+-+-+-+-+-+-+-+-+-+-+-+-+-+-+-+-+-+-+-+-+-+-+-+-+
~                                                               ~
|             Local Interface ID (4 or 16 octets)               |
+-+-+-+-+-+-+-+-+-+-+-+-+-+-+-+-+-+-+-+-+-+-+-+-+-+-+-+-+-+-+-+-+
~                                                               ~
|            Remote Interface ID (4 or 16 octets)               |
+-+-+-+-+-+-+-+-+-+-+-+-+-+-+-+-+-+-+-+-+-+-+-+-+-+-+-+-+-+-+-+-+
~                                                               ~
|        Advertising Node Identifier (4 or 6 octets)            |
+-+-+-+-+-+-+-+-+-+-+-+-+-+-+-+-+-+-+-+-+-+-+-+-+-+-+-+-+-+-+-+-+
~                                                               ~
|         Receiving Node Identifier (4 or 6 octets)             |
+-+-+-+-+-+-+-+-+-+-+-+-+-+-+-+-+-+-+-+-+-+-+-+-+-+-+-+-+-+-+-+-+
```

Fig. 16

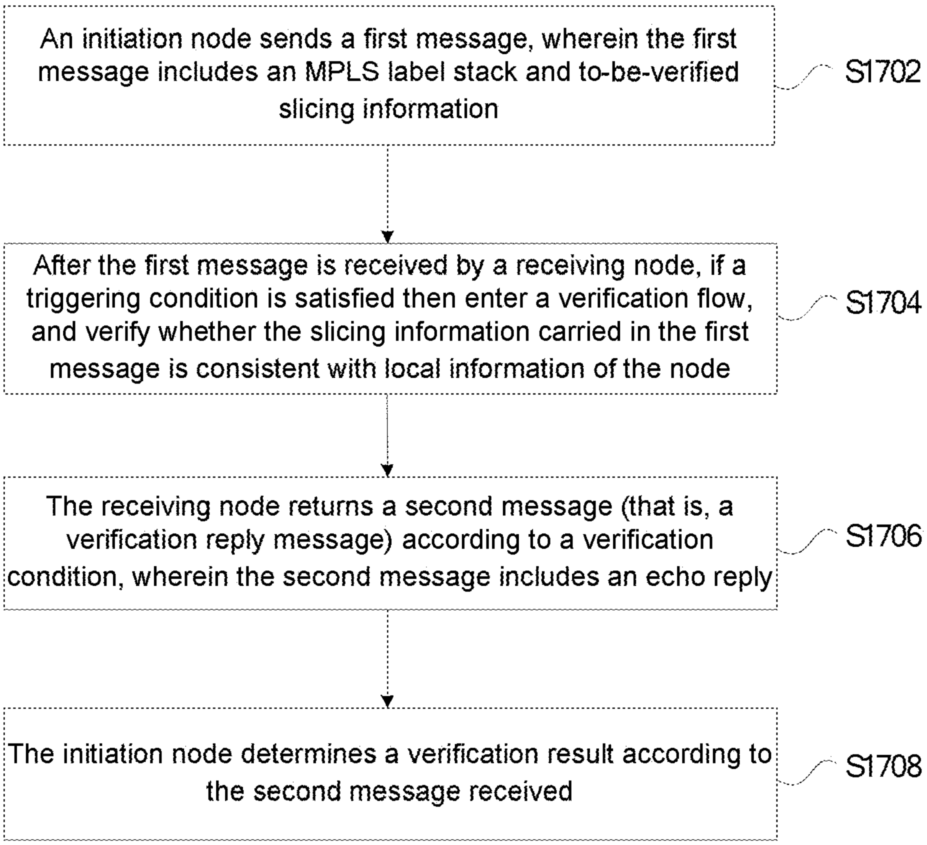

Fig. 17

```
+-----------------------------------+
|                 A1                |
+-----------------------------------+
|                 B1                |
+-----------------------------------+
|                 C1                |
+-----------------------------------+
|                 D1                |
+-----------------------------------+
~          MPLS Echo Request        ~
+-----------------------------------+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type = 1 (FEC TLV)       |             Length            |
+-+-+-+-+-+-+-+-+-+-+-+-+-+-+-+-+-+-+-+-+-+-+-+-+-+-+-+-+-+-+-+-+
|      Sub-Type = TBD1          |             Length            |
+-+-+-+-+-+-+-+-+-+-+-+-+-+-+-+-+-+-+-+-+-+-+-+-+-+-+-+-+-+-+-+-+
|                  IPv4 prefix=prefix D1                        |
+-+-+-+-+-+-+-+-+-+-+-+-+-+-+-+-+-+-+-+-+-+-+-+-+-+-+-+-+-+-+-+-+
|Prefix Length  |    Protocol   |          Slice ID= 1          |
+-+-+-+-+-+-+-+-+-+-+-+-+-+-+-+-+-+-+-+-+-+-+-+-+-+-+-+-+-+-+-+-+
```

SLICE INFORMATION VERIFICATION METHOD AND APPARATUS

CROSS-REFERENCE TO RELATED APPLICATION

The disclosure is a national stage filing under 35 U.S.C. § 371 of international application number PCT/CN2023/072696, filed on Jan. 17, 2023, which claims the priority to Chinese Patent Application CN202210658976.2, filed on Jun. 10, 2022 and entitled "Slice Information Verification Method and Apparatus", which is incorporated in its entirety herein by reference.

TECHNICAL FIELD

Embodiments of the disclosure relate to the field of communication, and particularly relate to a method and apparatus for verifying slicing information.

BACKGROUND

Segment routing (SR) is a routing method based on a source address. A segment routing header (SRH) is carried in a header of an existing multi-protocol label switching (MPLS) network or a header of internet protocol version 6 (IPv6), and a series of indication operations (also referred to as segment operations) are carried in the SRH for data routing and transmission in the network.

Network slicing, a conceptual breakthrough, is put forward in a fifth-generation (5G) network structure. Through the network slicing, operators can build a plurality of dedicated, virtualized and isolated logical networks on a common physical platform, satisfying diversified demands of various customers for network capabilities. Network slices are formed into a logically independent virtual network structure through a combination of network functions. Different network slices correspond to different resource guarantees and service levels. Especially, different slices probably differ dramatically on charging standards and operation and maintenance costs.

A basic LSP Ping/Trance route mechanism of MPLS is defined by RFC8029. This mechanism has been widely used for fault detection and location of an MPLS path, but is of limited use in verifying prefixes, links, notification protocols and other information associated with a segment identifier (SID) because of lack of the mechanism for verifying an associated slice identifier.

SUMMARY

Embodiments of the disclosure provide a method and apparatus for verifying slicing information, so as to at least solve a problem of lack of a mechanism for verifying an associated slice identifier in the related art.

An embodiment of the disclosure provides a method for verifying slicing information. The method is applied in a segment routing-multi-protocol label switching (SR-MPLS) network. The method includes: sending a first message by an initiation node. Slicing information to-be-verified is carried in the first message, such that whether the slicing information carried in the first message is consistent with local information of a receiving node is verified by the receiving node.

Another embodiment of the disclosure further provides a method for verifying slicing information. The method is applied in a segment routing-multi-protocol label switching (SR-MPLS) network. The method includes: receiving, by a receiving node, a first message sent by an initiation node, and verifying whether the slicing information carried in the first message is consistent with local information of the receiving node.

Yet another embodiment of the disclosure further provides an apparatus for verifying slicing information. The apparatus is applied in a segment routing-multi-protocol label switching (SR-MPLS) network. The apparatus includes: an initiation module configured to send a first message. Slicing information to-be-verified is carried in the first message, such that whether the slicing information carried in the first message is consistent with local information of a receiving node is verified by the receiving node.

Yet another embodiment of the disclosure further provides an apparatus for verifying slicing information. The apparatus is applied in a segment routing-multi-protocol label switching (SR-MPLS) network. The apparatus includes: a Receiving module configured to receive a first message sent by an initiation node, and verify whether the slicing information carried in the first message is consistent with local information of a receiving node.

Yet another embodiment of the disclosure further provides a computer-readable storage medium that stores a computer program. The computer program is configured to execute steps of any one of the above method embodiments at runtime.

Still another embodiment of the disclosure further provides an electronic apparatus. The electronic apparatus includes a memory and a processor. The memory stores a computer program. The processor is configured to run the computer program so as to execute steps of any one of the above method embodiments.

BRIEF DESCRIPTION OF THE DRAWINGS

FIG. 11 is a schematic diagram of a message format of a multi-protocol label switching (MPLS) echo request/reply according to an embodiment of the disclosure;

FIG. 12 is a flow diagram of a method for verifying slicing information according to a scenario embodiment of the disclosure;

FIG. 16 is a schematic diagram of a sub-TLV format of an Adjacency SID slice according to a scenario embodiment of the disclosure;

FIG. 17 is a flow diagram of a method for verifying slicing information according to a scenario embodiment of the disclosure;

DETAILED DESCRIPTION OF THE EMBODIMENTS

Embodiments of the disclosure will be described in detail below with reference to the accompanying drawings in conjunction with the embodiments.

It should be noted that terms such as "first" and "second" in the description, claims and the drawings of the disclosure are used to distinguish similar subjects instead of describing a specific order or precedence order.

Figure 1:
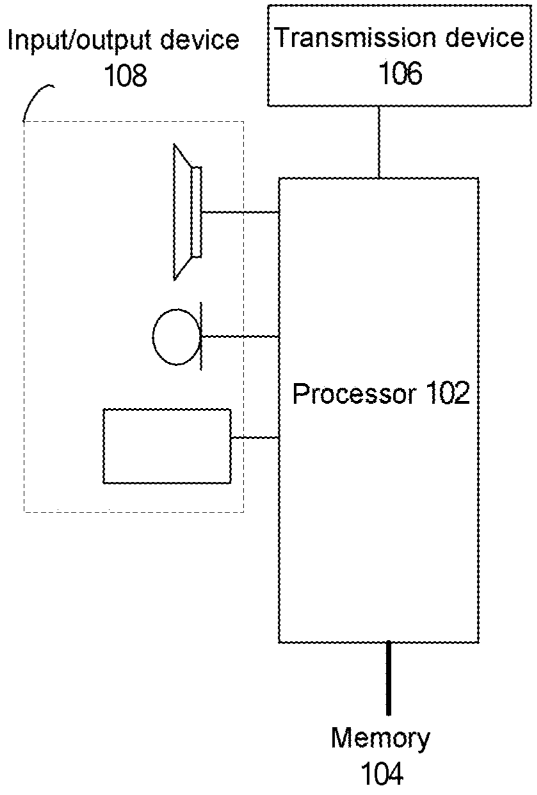
FIG. 1 is a block diagram of a hardware structure of a mobile terminal of a method for verifying slicing information according to an embodiment of the disclosure.

The methods provided by the embodiments of the disclosure may be executed in a mobile terminal, a computer terminal or a similar computation apparatus. With running on the mobile terminal as an instance, FIG. 1 is a block diagram of a hardware structure of a mobile terminal of a method for verifying slicing information according to an embodiment of the disclosure. As shown in FIG. 1, the mobile terminal may include one or more (only one is shown in FIG. 1) processors 102 (the processor 102 may include, but is not limited to, a processing apparatus, for instance, a microcontroller unit (MCU) or a field programmable gate array (FPGA)) and a memory 104 configured to store data. The mobile terminal may further include a transmission device 106 having a communication function and an input/output device 108. The ordinary skilled person in the art may understand that a structure shown in FIG. 1 is merely schematic and does not limit a structure of the mobile terminal. For instance, the mobile terminal may further include more or fewer components than those shown in FIG. 1, or have a different configuration from that shown in FIG. 1.

The memory 104 may be configured to store a computer program such as a software program and module of application software, and for instance, the computer program corresponding to the method for verifying slicing information in the embodiments of the disclosure. The processor 102 executes various functional applications and data processing by running the computer program stored in the memory 104, that is, implements the method. The memory 104 may include a high-speed random access memory, and may further include a non-volatile memory, for instance, one or more magnetic storage apparatuses, flash memories, or other non-volatile solid-state memories. In some instances, the memory 104 may further include a memory remotely arranged with respect to the processor 102. The remote memory may be connected to the mobile terminal by means of a network. Instances of the network include, but are not limited to, the Internet, an enterprise intranet, a local area network, a mobile communication network, and their combinations.

A transmission apparatus 106 is configured to receive or send data by means of a network. Specific instances of the network may include a wireless network provided by a communication provider of the mobile terminal. In one instance, the transmission apparatus 106 includes one network interface controller (NIC) that may be connected with other network devices by means of a base station so as to be in communication with the Internet. In one instance, the transmission apparatus 106 may be a radio frequency (RF) module that is configured to be in wireless communication with the Internet.

Figure 2:
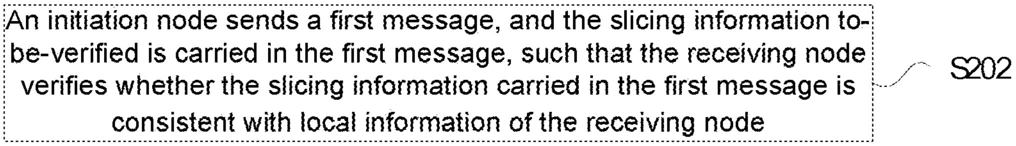
FIG. 2 is a flow diagram of a method for verifying slicing information according to an embodiment of the disclosure.

The embodiment provides a method for verifying slicing information. The method runs on the mobile terminal. FIG. 2 is a flow diagram of the method for verifying slicing information according to an embodiment of the disclosure. As shown in FIG. 2, the flow includes the following steps:

S202, a first message is sent by an initiation node, where slicing information to-be-verified is carried in the first message, such that whether the slicing information carried in the first message is consistent with local information of a receiving node is verified by the receiving node.

In the step, the first message is sent by the initiation node. The slicing information to-be-verified is carried in the first message, such that whether the slicing information carried in the first message is consistent with the local information of the receiving node is verified by the receiving node. In this way, a problem of lack of a mechanism for verifying an associated slice identifier in a segment routing-multi-protocol label switching (SR-MPLS) network can be solved, such that effects of detection and path location in an SR-MPLS slice can be achieved.

In an illustrative embodiment, a multi-protocol label switching (MPLS) echo request or an MPLS echo reply is further carried in the first message.

Figure 3:
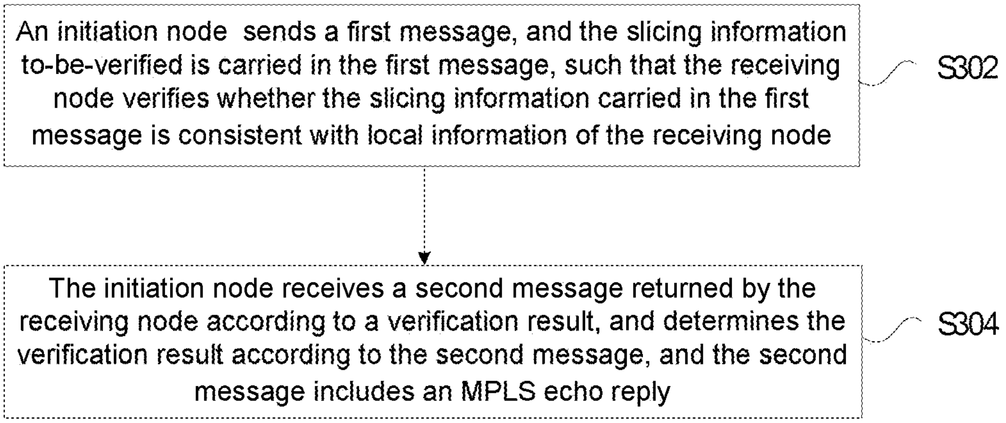
FIG. 3 is a flow diagram of a method for verifying slicing information according to an embodiment of the disclosure.

In an illustrative embodiment, in a case that the MPLS echo request is carried in the first message, after the first message is sent by the initiation node, the method further includes the following steps: a second message returned by the receiving node according to a verification result is received by the initiation node, and the verification result is determined according to the second message. The second message includes the MPLS echo reply. FIG. 3 is a flow diagram of a method for verifying slicing information according to an embodiment of the disclosure. As shown in FIG. 3, the flow includes the following steps:

At S302, a first message is sent by an initiation node, where slicing information to-be-verified is carried in the first message, such that whether the slicing information carried in the first message is consistent with local information of a receiving node is verified by the receiving node.

At S304, a second message returned by the receiving node according to a verification result is received by the initiation node, and the verification result is determined according to the second message, where the second message includes an MPLS echo reply.

Figure 4:
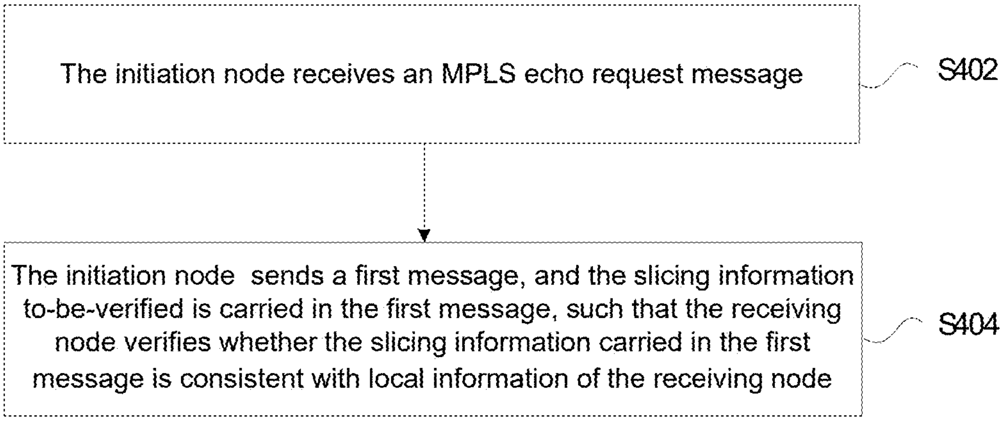
FIG. 4 is a flow diagram of a method for verifying slicing information according to an embodiment of the disclosure.

In an illustrative embodiment, in a case that the MPLS echo reply is carried in the first message, before the first message is sent by the initiation node, the method further includes the following step: an MPLS echo request message is received by the initiation node. FIG. 4 is a flow diagram of a method for verifying slicing information according to an embodiment of the disclosure. As shown in FIG. 4, the flow includes the following steps:

At S402, an MPLS echo request message is received by an initiation node.

At S404, a first message is sent by the initiation node, where slicing information to-be-verified is carried in the first message, such that whether the slicing information carried in the first message is consistent with local information of a receiving node is verified by the receiving node.

In an illustrative embodiment, in response to determining that an MPLS echo request is further carried in the first message, the step that the first message is sent by the initiation node includes the following step: the first message is sent to an egress node by the initiation node; and the step that the second message returned by the egress node according to the verification result is received by the initiation node includes the following step: the verification result from the egress node is received and determined by the initiation node, such that whether a path is connected is detected. The verification result is that the egress node inquires an own local entry and verifies whether a slice identifier (ID) in a sub-type-length-value (sub-TLV) of a forwarding equivalence class (FEC) TLV is consistent with that in the local entry.

The ordinary skilled person in the art should know that the MPLS echo request and an MPLS echo reply may include a plurality of TLVs, such as the FEC TLV and a reply path (RP) TLV. One TLV may include a plurality of sub-TLVs.

The ordinary skilled person in the art should know that the above egress node is an egress node on one forwarding path, the initiation node sends a message to the egress node, and whether the message may reach the egress node depends on path connectivity and other factors.

The ordinary skilled person in the art should know that in response to determining that the egress node inquires the own local entry and verifies whether the slice identifier (ID) in the sub-TLV of the forwarding equivalence class (FEC) TLV is consistent with that in the local entry, in addition to the necessary slice ID, a prefix/link, a notification protocol, a service function, an algorithm, multi-topology and other information may be further included.

In an illustrative embodiment, in response to determining that the MPLS echo request is carried in the first message, the step that the first message is sent by the initiation node further includes the following steps: the first message is sent to the receiving nodes one by one by the initiation node, and slicing information verification of each of the receiving nodes is triggered by an MPLS label of the slicing information to-be-verified. The MPLS echo request includes verifying a forwarding equivalence class (FEC) TLV. The FEC TLV includes sub-TLV information and/or TLV information of downstream detailed mapping (DDM). The sub-TLV information includes first slicing information.

The ordinary skilled person in the art should know that in response to determining that slicing information verification of each of the receiving nodes is triggered by setting the MPLS label associated with the slicing information to-be-verified, time to live (TTL) of the MPLS label has various modes. One mode is that as long as TTL of an initial stack top label is set, a following label may copy TTL of a previous label. In this case, TTL of each label does not need to be set. In addition, in a case that a plurality of labels are on one node, a to-be-verified label is not necessarily the stack top label received.

The ordinary skilled person in the art should know that a number of the above receiving nodes may be one or more. In response to determining that a forwarding path has only one hop, only one receiving node may exist.

In an illustrative embodiment, in response to determining that the MPLS echo reply is carried in the first message, the step that the first message is sent by the initiation node includes the following steps: the MPLS echo request message is received by the initiation node, where the MPLS echo request message includes an RP TLV, the RP TLV includes forwarding equivalence class (FEC) information of the reply path, and the FEC information includes the first slicing information; and the first message is sent by the initiation node through the reply path, where the reply path is located and matched by the receiving node according to the FEC information, the first message includes an MPLS label stack and an MPLS echo reply corresponding to the reply path, and the MPLS echo reply includes the RP TLV.

The ordinary skilled person in the art should know that in response to determining that the reply path is located and matched by the receiving node according to the FEC information, the reply path may be located and matched with a tail node of the reply path or any receiving node that returns the verification result. That is, all receiving nodes that return the verification result may be used for locating and matching.

In an illustrative embodiment, the step that the first message is sent by the initiation node further includes the following steps: the MPLS echo request message is received by the initiation node, and an R identifier in the MPLS echo request message is set; and the first message is sent by the initiation node. A reverse path target forwarding equivalence class stack TLV is carried in the MPLS echo reply of the first message. The first slicing information is carried in the reverse path target forwarding equivalence class stack TLV.

In the embodiment of the disclosure, the first message is sent by the initiation node. The slicing information to-be-verified is carried in the first message, such that whether the slicing information carried in the first message is consistent with the local information of the receiving node is verified by the receiving node. In this way, a problem of lack of a mechanism for verifying an associated slice identifier in an SR-MPLS network can be solved, such that effects of detection and path location in an SR-MPLS slice can be achieved.

Figure 5:
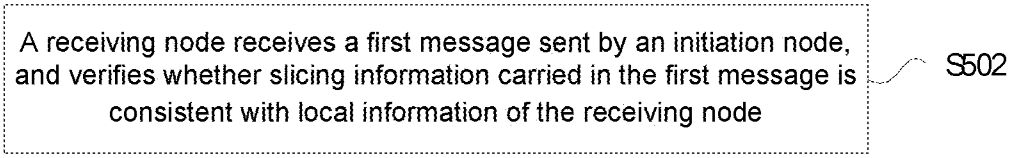
FIG. 5 is a flow diagram of a method for verifying slicing information according to an embodiment of the disclosure.

Another embodiment of the disclosure further provides a method for verifying slicing information. The method is applied in a segment routing-multi-protocol label switching (SR-MPLS) network. FIG. 5 is a flow diagram of a method for verifying slicing information according to an embodiment of the disclosure. As shown in FIG. 5, the flow includes the following step:

At S502, a first message sent by an initiation node is received by a receiving node, and whether slicing information carried in the first message is consistent with local information of the receiving node is verified.

In an illustrative embodiment, the receiving node verifies whether the slicing information carried in the first message is consistent with the local information of the receiving node by satisfying a triggering condition. The triggering condition includes at least one of the following conditions: a router alert option included in an internet protocol (IP) header; IP time to live (TTL) expiration; MPLS time to live (TTL) expiration; a label being an MPLS router alert label; and a destination IP being within a range of 127/8.

In an illustrative embodiment, a multi-protocol label switching (MPLS) echo request or an MPLS echo reply is further carried in the first message.

Figure 6:
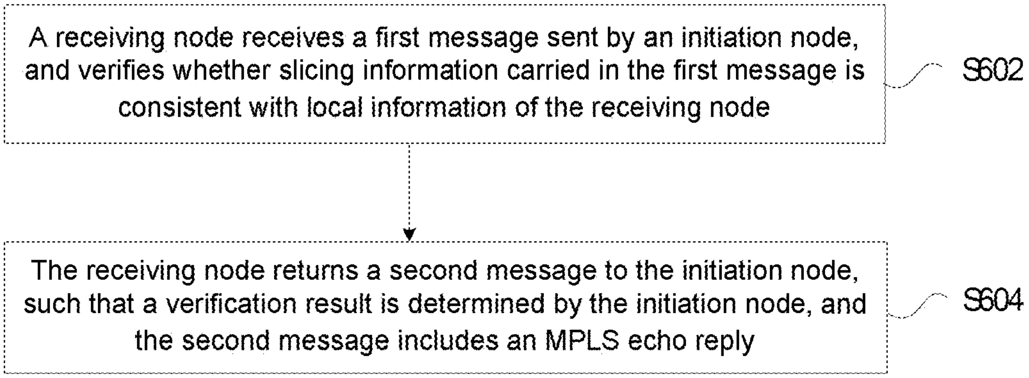
FIG. 6 is a flow diagram of a method for verifying slicing information according to an embodiment of the disclosure.

In an illustrative embodiment, in a case that the MPLS echo request is carried in the first message, after whether the slicing information carried in the first message is consistent with the local information of the receiving node is verified by the receiving node, the method further includes the following step: a second message is returned to the initiation node by the receiving node, such that a verification result is determined by the initiation node. The second message includes the MPLS echo reply. FIG. 6 is a flow diagram of a method for verifying slicing information according to an embodiment of the disclosure. As shown in FIG. 6, the flow includes the following steps:

At S602, a first message sent by an initiation node is received by a receiving node, and whether slicing information carried in the first message is consistent with local information of the receiving node is verified.

At S604, a second message is returned to the initiation node by the receiving node, such that a verification result is determined by the initiation node, where the second message includes an MPLS echo reply.

In an illustrative embodiment, in response to determining that an MPLS echo request is carried in the first message, the step that the first message sent by the initiation node is received by the receiving node further includes the following steps: the receiving node allocates a segment identifier associated with first slicing information; and a mapping entry between the segment identifier and the first slicing information is locally generated by the receiving node. The step that whether the first slicing information is consistent with the local information of the receiving node is verified by the receiving node includes the following steps: an own local entry is inquired by an egress node of the receiving node according to the first message, such that whether a slice ID in sub-TLV information of a forwarding equivalence class (FEC) TLV is consistent with that in the local entry is verified; and a verification result is returned to the initiation node by the receiving node, and the verification result is determined by the initiation node, such that whether the first slicing information is verified is determined.

In an illustrative embodiment, in response to determining that the MPLS echo request is carried in the first message, the step that the first message sent by the initiation node is received by the receiving node further includes the following steps: the receiving node allocates a segment identifier associated with the first slicing information; and a mapping entry between the segment identifier and the first slicing information is locally generated by the receiving node; and the step that whether the first slicing information is consistent with the local information of the receiving node is verified by the receiving node includes the following step: slicing information verification of each of the receiving nodes is triggered by the receiving node according to an MPLS label of the slicing information to-be-verified in the first message. The MPLS echo request includes verifying a forwarding equivalence class (FEC) TLV. The FEC TLV includes sub-TLV information and/or TLV information of downstream detailed mapping (DDM). The sub-TLV information includes the first slicing information. The receiving node at least includes a first receiving node.

The ordinary skilled person in the art should know that the segment identifier mentioned in the above step is a segment identifier (SID) associated with the slice. The identifier may be a prefix segment identifier (SID), an adjacent SID, or other SIDs, and is not limited herein as long as specific demands of specific embodiments are satisfied. However, the prefix SID and the adjacent SID mentioned in the embodiment of the disclosure are two typical SIDs, and are applicable to all the embodiments of the disclosure.

Figure 7:
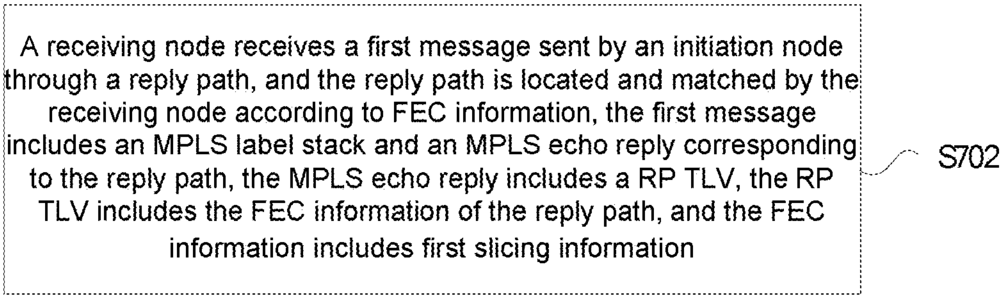
FIG. 7 is a flow diagram of a method for verifying slicing information according to an embodiment of the disclosure.

In an illustrative embodiment, in response to determining that the MPLS echo reply is carried in the first message, the step that the first message sent by the initiation node is received by the receiving node further includes the following step: the first message sent by the initiation node through a reply path is received by the receiving node. The reply path is located and matched by the receiving node according to forwarding equivalence class (FEC) information. The first message includes an MPLS label stack and an MPLS echo reply corresponding to the reply path. The MPLS echo reply includes an RP TLV. The RP TLV includes the FEC information of the reply path. The FEC information includes first slicing information. FIG. 7 is a flow diagram of a method for verifying slicing information according to an embodiment of the disclosure. As shown in FIG. 7, the flow includes the following steps:

At S702, a first message sent by an initiation node through a reply path is received by a receiving node, where the reply path is located and matched by the receiving node according to forwarding equivalence class (FEC) information, the first message includes an MPLS label stack and an MPLS echo reply corresponding to the reply path, the MPLS echo reply includes an RP TLV, the RP TLV includes the FEC information of the reply path, and the FEC information includes first slicing information.

In an illustrative embodiment, the step that the first message sent by the initiation node is received by the receiving node further includes the following step: the first message is received by the receiving node, where a reverse path target forwarding equivalence class stack TLV is carried in the MPLS echo reply of the first message, and the first slicing information is carried in the reverse path target forwarding equivalence class stack TLV.

From the description of the embodiments, those skilled in the art may clearly understand that the methods according to the above embodiments may be implemented by means of software plus a necessary general-purpose hardware platform, or by means of hardware. In many cases, the former is a better embodiment. With such understanding, the technical solution of the embodiments of the disclosure, in essence or from the view of part contributing to the prior art, may be embodied in a form of a software product, where the computer software product is stored in a storage medium (such as a read-only memory (ROM)/random access memory (RAM), a magnetic disk and an optical disk) and includes several instructions configured to enable a terminal device (which may be a mobile phone, a computer, a server, a network device, etc.) to conduct the method in each of the embodiments of the disclosure.

The embodiment further provides an apparatus for verifying slicing information. The apparatus is configured to implement the embodiment and the preferred embodiment, and will not be repeated herein. The term "module", as used below, may achieve a combination of software and/or hardware having predetermined functions. While the apparatus described in the following embodiments is preferably implemented in software, implementation of hardware, or a combination of software and hardware, is also possible and conceivable.

Figure 8:
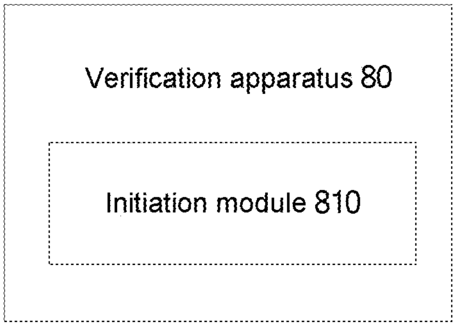
FIG. 8 is a block diagram of a structure of an apparatus for verifying slicing information according to an embodiment of the disclosure.

FIG. 8 is a block diagram of a structure of an apparatus for verifying slicing information according to an embodiment of the disclosure. As shown in FIG. 8, the verification apparatus 80 includes: an initiation module 810 configured to send a first message. Slicing information to-be-verified is carried in the first message, such that whether the slicing information carried in the first message is consistent with local information of a receiving node is verified by the receiving node.

In an illustrative embodiment, a multi-protocol label switching (MPLS) echo request or an MPLS echo reply is further carried in the first message.

Figure 9:
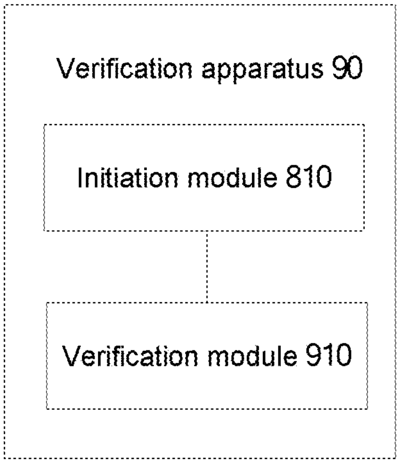
FIG. 9 is a block diagram of a structure of an apparatus for verifying slicing information according to an embodiment of the disclosure.

In an illustrative embodiment, FIG. 9 is a block diagram of a structure of an apparatus for verifying slicing information according to an embodiment of the disclosure. As shown in FIG. 9, in addition to the initiation module 810 in FIG. 8, the verification apparatus 90 further includes a verification module 910 configured to receive and determine, in response to determining that the MPLS echo request is carried in the first message, a verification result from an egress node, such that whether a path is connected is detected. The verification result is that the egress node inquires an own local entry and verifies whether a slice ID in a sub-TLV of a forwarding equivalence class (FEC) TLV is consistent with that in the local entry.

In an illustrative embodiment, in response to determining that the MPLS echo request is carried in the first message, the initiation module 810 is further configured to send the first message to the receiving nodes one by one, and trigger slicing information verification of each of the receiving nodes by setting an MPLS label associated with the slicing information to-be-verified. The MPLS echo request includes verifying a forwarding equivalence class (FEC) TLV. The FEC TLV includes sub-TLV information and/or TLV information of downstream detailed mapping (DDM). The sub-TLV information includes first slicing information.

In an illustrative embodiment, in a case that the MPLS echo reply is carried in the first message, the initiation module 810 is further configured to receive an MPLS echo request message, where the MPLS echo request message includes an RP TLV, the RP TLV includes forwarding equivalence class (FEC) information of a reply path, and the FEC information includes first slicing information; and the initiation module 810 is further configured to send the first message through the reply path, where the reply path is located and matched by the receiving node according to the FEC information, the first message includes an MPLS label stack and an MPLS echo reply corresponding to the reply path, and the MPLS echo reply includes the RP TLV.

In an illustrative embodiment, the initiation module 810 is further configured to: receive the MPLS echo request message, and set an R identifier in the MPLS echo request message; and send the first message, where a reverse path target forwarding equivalence class stack TLV is carried in the MPLS echo reply of the first message, and first slicing information is carried in the reverse path target forwarding equivalence class stack TLV.

Figure 10:
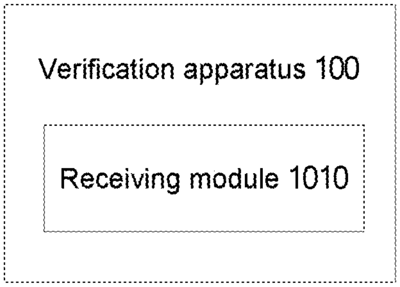
FIG. 10 is a block diagram of a structure of an apparatus for verifying slicing information according to an embodiment of the disclosure.

Another embodiment of the disclosure further provides an apparatus for verifying slicing information. The apparatus is applied in a segment routing-multi-protocol label switching (SR-MPLS) network. FIG. 10 is a block diagram of a structure of an apparatus for verifying slicing information according to an embodiment of the disclosure. As shown in FIG. 10, the verification apparatus 100 includes: a Receiving module 1010 configured to receive a first message sent by an initiation node, and verify whether the slicing information carried in the first message is consistent with local information of a receiving node.

In an illustrative embodiment, the Receiving module 1010 includes: a determination sub-module configured to determine, before the receiving node verifies whether the slicing information carried in the first message is consistent with the local information of the receiving node, whether the receiving node satisfies a triggering condition. The triggering condition includes at least one of the following conditions: a router alert option included in an IP header; IP time to live (TTL) expiration; MPLS time to live (TTL) expiration; a label being an MPLS router alert label; and a destination IP being within a range of 127/8.

It should be noted that all the modules may be implemented by software or hardware, implementation by hardware may be implemented as follows, but are not limited thereto: the modules are located in a same processor; or the modules are separately located in different processors in any combination form.

An embodiment of the disclosure further provides a computer-readable storage medium that stores a computer program. The computer program is configured to execute steps of any one of the above method embodiments at runtime.

In an illustrative embodiment, the computer-readable storage medium may include, but is not limited to, a universal serial bus (USB) flash disk, read-only memory (ROM), a random access memory (RAM), a mobile hard disk, a magnetic disk, an optical disk, and various media that may store computer programs.

An embodiment of the disclosure further provides an electronic apparatus that includes a memory and a processor. The memory stores a computer program. The processor is configured to run a computer program so as to execute steps of any one of the above method embodiments.

In an illustrative embodiment, the electronic apparatus may further include a transmission device and an input/output device. The transmission device is connected to the processor, and the input/output device is connected to the processor.

Reference may be made to the instances described in the above embodiments and illustrative embodiments for specific instances in the embodiment, which is not repeated herein.

Obviously, those skilled in the art should understand that the modules or steps of the embodiments of the disclosure may be implemented with a general-purpose computation apparatus, may be centralized on a single computation apparatus or distributed on a network composed of a plurality of computation apparatuses, or may be implemented with program codes executable by the computation apparatus, such that the modules or steps may be stored in a storage apparatus so as to be executed by the computation apparatus. In some cases, the steps shown or described may be executed in an order different from that herein, or may be fabricated separately as individual integrated circuit modules. Alternatively, a plurality of modules or steps of the modules or steps may be fabricated as a single integrated circuit module for implementation. In this way, the disclosure is not limited to any particular combination of hardware and software.

To make those skilled in the art better understand the technical solution of the embodiments of the disclosure, the embodiments of the disclosure will further described in detail below with reference to specific scenario embodiments.

An identity (ID) of a network slice may be called a slice identifier or a slice ID for short, and is configured to identify the network slice. In some technologies, the slice ID is also referred to as a network resource partition policy ID (NRP-ID). The identity of the network slice is referred to as the slice identifier in a unified manner herein.

According to specific technical means of implementing network slicing, the slice identifier may have different meanings and forms. One identity may be regarded as a slice identifier as long as the identity may uniquely distinguish slices or resources in a specific range (for instance, a physical port/link, a same interior gateway protocol (IGP) domain, an entire network range, etc.).

In response to determining that slicing is implemented in the SR-MPLS network, one of main modes is to allocate an SID (that is, an MPLS label) to each slice on a node or link. For instance, if two network slices need to be divided on a same node and resources are allocated to slice 1 and slice 2, slice ID 1 and corresponding SID A may be allocated to the slice 1 on the node, and slice ID 2 and corresponding SID B may be allocated to the slice 2 on the node. However, a mapping relation between labels and slice identities (that is, the SID A is associated with the slice ID 1 and the SID B is associated with the slice ID 2) needs to be notified to the outside, and for instance, flooding through an intermediate system-to-intermediate system (IS-IS) or open shortest path first (OSPF) protocol.

A basic label switched path (LSP) Ping/Trance route mechanism of MPLS is defined by RFC8029. This mechanism has been widely used for fault detection and location of an MPLS path, and is mainly based on a MPLS echo request/reply message. The message is a user datagram protocol (UDP) message, a format of which is as shown in FIG. 11.

The LSP Ping/Trance route mechanism in an SR-MPLS scenario is defined by RFC8287, and is only limited to verifying prefixes, links, notification protocols and other information associated with an SID, because of lack of the mechanism for verifying an associated slice identifier.

Scenario Embodiment 1

FIG. 12 is a flow diagram of a method for verifying slicing information according to a scenario embodiment of the disclosure. The method is applied in an SR-MPLS network. As shown in FIG. 12, the flow includes the following steps:

At S1202, a first message is sent by an initiation node, where the first message includes an MPLS label stack and slicing information to-be-verified.

The first message may include an MPLS echo request, and the slicing information to-be-verified is included in an FEC TLV in a form of sub-TLV and carried in the echo request. The first message may include an MPLS echo reply, and the slicing information to-be-verified is included in a reply path TLV in a form of sub-TLV and carried in the echo reply.

Alternatively, the first message may include an MPLS echo reply, and the slicing information to-be-verified is included in a reverse-path target FEC stack TLV in a form of sub-TLV and carried in the echo reply.

At S1204, after the first message is received by a receiving node, a verification flow is entered in response to satisfying a triggering condition, and whether the slicing information carried in the first message is consistent with local information of the node is verified.

The triggering condition includes, but is not limited to, one of the following conditions specified in RFC8029:

a router alert option included in an IP header;

IP time to live (TTL) expiration;

MPLS time to live (TTL) expiration;

a label being an MPLS router alert label; and a destination IP being within a range of 127/8.

The ordinary skilled person in the art should know that the first message received is not exactly consistent with that sent, and may be subjected to MPLS label removal, switching and other operations.

Figures 13, 14, 15:
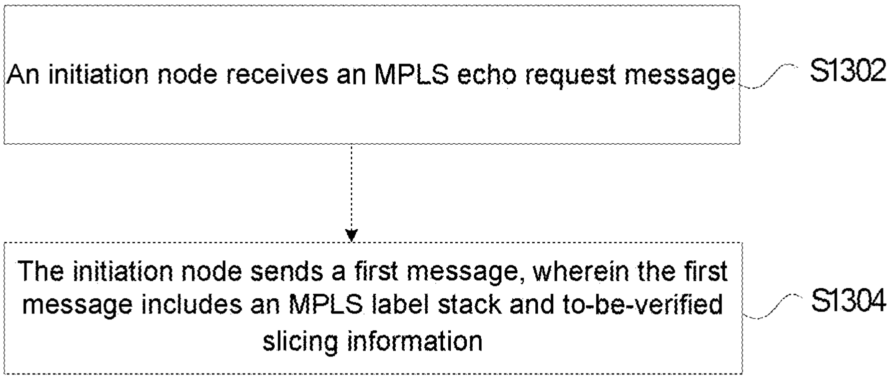
FIG. 13 is a flow diagram of a method for verifying slicing information according to a scenario embodiment of the disclosure.
FIG. 14 is a schematic diagram of a sub-type-length-value (sub-TLV) format of an internet protocol version 4 prefix segment identifier (IPv4 Prefix SID) slice according to a scenario embodiment of the disclosure.
FIG. 15 is a schematic diagram of a sub-TLV format of an IPv6 Prefix SID slice according to a scenario embodiment of the disclosure.

FIG. 13 is a flow diagram of a method for verifying slicing information according to a scenario embodiment of the disclosure. As shown in FIG. 13, in a case that a first message includes an MPLS echo reply, the flow includes the following steps:

At S1302, an MPLS echo request message is received by an initiation node.

At S1304, the first message is sent by the initiation node, where the first message includes an MPLS label stack and slicing information to-be-verified.

FIG. 14 is a schematic diagram of a sub-TLV format of an internet protocol version 4 prefix segment identifier (IPv4 Prefix SID) slice according to a scenario embodiment of the disclosure. FIG. 15 is a schematic diagram of a sub-TLV format of an IPv6 Prefix SID slice according to a scenario embodiment of the disclosure. FIG. 16 is a schematic diagram of a sub-TLV format of an Adjacency SID slice according to a scenario embodiment of the disclosure.

The ordinary skilled person in the art should know that it may also be agreed that when the slice ID is a special value (for instance, Slice ID=0), it is indicated that the slicing information does not need to be verified. According to different types of the SID, in addition to verifying the slice ID corresponding to the slice associated with the SID, to-be-verified contents in the sub-TLV may further include, but are not limited to, a prefix and a link associated with the SID, a protocol notification of the SID, a service function, an algorithm, multi-topology, and other information.

FIG. 17 is a flow diagram of a method for verifying slicing information according to a scenario embodiment of the disclosure. As shown in FIG. 17, in a case that a first message includes an echo request, the flow includes the following steps:

At S1702, the first message is sent by an initiation node, where the first message includes an MPLS label stack and slicing information to-be-verified.

The first message may include an MPLS echo request, and the slicing information to-be-verified is included in an FEC TLV in a form of sub-TLV and carried in the echo request. The first message may include an MPLS echo reply, and the slicing information to-be-verified is included in a reply path TLV in a form of sub-TLV and carried in the echo reply.

Alternatively, the first message may include an MPLS echo reply, and the slicing information to-be-verified is included in a reverse-path target FEC stack TLV in a form of sub-TLV and carried in the echo reply.

At S1704, after the first message is received by a receiving node, a verification flow is entered in response to satisfying a triggering condition, and whether the slicing information carried in the first message is consistent with local information of the node is verified.

At S1706, a second message (that is, a verification reply message) is returned by the receiving node according to a verification condition, where the second message includes an echo reply.

At S1708, a verification result is determined by the initiation node according to the second message received.

Scenario Embodiment 2

A main objective of a Ping mode is to detect connectivity of the path, and further to detect whether a destination node reached is a real destination node of the path, that is, to verify whether a corresponding FEC of a destination label on an egress node is consistent with that of an FEC TLV carried in a detection message. In the ping mode, the detection message at least needs to include an FEC corresponding to a path destination SID.

Figures 18, 19, 20:
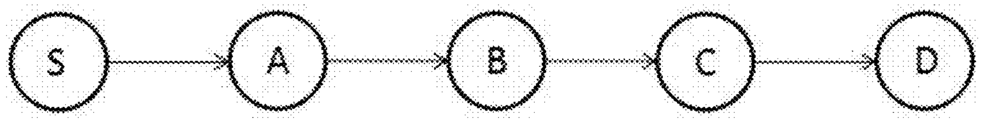
FIG. 18 is a schematic diagram of node networking of a method for verifying slicing information according to a scenario embodiment of the disclosure.
FIG. 19 is a schematic diagram of sending a message from an initiation node according to a scenario embodiment of the disclosure.
FIG. 20 is a schematic diagram of a forwarding equivalence class (FEC) TLV format according to a scenario embodiment of the disclosure.

The embodiment specifically describes a method for verifying slicing information in the ping mode. FIG. 18 is a schematic diagram of node networking of a method for verifying slicing information according to a scenario embodiment of the disclosure. ISIS is used as a control plane protocol of SR-MPLS in the IPv4 network. As shown in FIG. 18, on nodes A, B, C and D, resources are allocated to slice 1 and slice 2 respectively, which correspond to slice identities Slice ID 1 and Slice ID 2 respectively.

Node A allocates a prefix SID related to the slice 1 as SID A1 to prefix A of a loopback route. Node B allocates a prefix SID related to the slice 1 as SID B1 to prefix B of a loopback route. Node C allocates a prefix SID related to the slice 1 as SID B1 to prefix C of a loopback route. Node D allocates a prefix SID related to the slice 1 as SID D1 to prefix D of a loopback route.

The nodes may generate mapping entries of their allocated SIDs and slices locally. In addition, each node may further flood its own SID information through IS-IS, and meanwhile, carry the slice ID associated with the SID. After the flooding information is received by other nodes, an entry related to slicing may be locally generated. For slice ID information in the entry, the slice ID may be carried in an in-label mapping (ILM) entry or a next hop label forwarding entry (NHLFE) entry.

In order to verify whether connectivity and exit information of a path corresponding to the slice 1 are correct, the message sent by node S is shown in FIG. 19. TTL of SID A1 is set as 255. FIG. 19 is a schematic diagram of sending a message from an initiation node according to a scenario embodiment of the disclosure. An MPLS echo request includes an FEC TLV. The FEC TLV includes a sub-TLV. A prefix, a notification protocol and slice ID information corresponding to to-be-verified SID D1 on node D are carried in the sub-TLV. FIG. 20 is a schematic diagram of an FEC TLV format according to a scenario embodiment of the disclosure. A packaging format of the FEC TLV is as shown in FIG. 20.

A message is forwarded normally according to a label stack, sequentially passes nodes A, B and C, and reaches node D. As a destination IP of a message with label D1 removed is within 127/8, a verification flow is entered. The node D inquires its local entry and determines whether a prefix, a notification protocol and a slice ID in an FEC sub-TLV are consistent with those in the local entry through comparison. After verification, a verification reply message is returned to explain the verification result. If the result indicates that the above data are consistent, a verification success message is returned. Otherwise, a verification failure message is returned.

After the verification reply message is received by the node S, the verification result is determined according to a message content.

In the scenario embodiment, the node D receives the message and finds that the node does notify SID D1 through IS-IS, and a slice ID associated with D1 is 1, which is consistent with the content in a sub-TLV of an FEC TLV in a verification request message received, such that verification is passed.

Scenario Embodiment 3

A trace route mode is configured for information verification on each label switching router (LSR) passed by a forwarding path. When a verification request message is sent for the first time, an FEC TLV needs to include FEC information corresponding to all labels in a label stack.

A method for verifying slicing information in the trace route mode is specifically explained in the embodiment.

Figure 21:
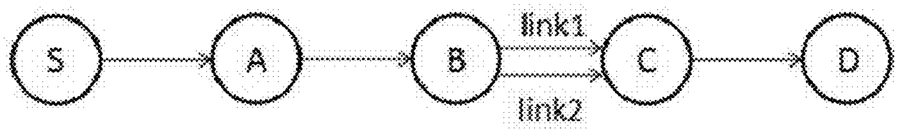
FIG. 21 is a schematic diagram of node networking of a method for verifying slicing information according to a scenario embodiment of the disclosure.

FIG. 21 is a schematic diagram of node networking of a method for verifying slicing information according to a scenario embodiment of the disclosure. As shown in FIG. 21, OSPF is used as a control plane protocol of SR-MPLS in an IPv6 network. Node A allocates a prefix SID related to the slice 1 as SID A1 to prefix A of a loopback route. Node B allocates a prefix SID related to the slice 1 as SID B1 to prefix B of a loopback route. Node B allocates an adj-SID related to the slice 1 as SID BC1 to link 1 between B-C. Node D allocates a prefix SID related to the slice 1 as SID D1 to prefix D of a loopback route.

The nodes may generate mapping entries of their allocated SIDs and slices locally. In addition, each node may further flood its own SID information through OSPF, and carry the slice ID associated with the SID. After the flooding information is received by other nodes, an entry related to slicing may be locally generated. For slice ID information in the entry, the slice ID may be carried in an in-label mapping (ILM) entry or a next hop label forwarding entry (NHLFE) entry.

When the trace route mode is used to detect paths corresponding to slices 1 of nodes S-D, specific steps are as follows:

At S301, as an initiation node, node S sends messages <A1, B1, BC1, D1><FEC-A1, FEC-B1, FEC-BC1, FEC-D1>, where A1, B1, C1 and D1 are MPLS label values corresponding to SIDA1, SIDB1, SIDBC1 and SIDD1, respectively. When a verification message is sent to an intermediate node of a path, in addition to an FEC TLV, the message further carries a downstream detailed mapping TLV (hereinafter referred to as a DDM TLV). When the message is sent to an egress node of the path, the message may include no DDM TLV. TTL of A1 of a stack top label is set as 1.

A flow related to slicing verification will be mainly introduced below. A general flow of LSP ping/traceroute will not be described in detail.

At S302, after a message is received by node A, the message is sent to a control plane because the TTL of the label is 1 and becomes 0 after one is subtracted from the TTL, and a verification flow is entered. The node A inquires a local entry, whether a prefix, a notification protocol and slice ID information related to the SID A1 are consistent with those of FEC A1 is determined, and a verification result message is returned through an echo reply.

In addition, an operation of the node A for label A1 is pop. According to provisions of RFC8287, forwarding equivalence class stack change sub-TLV (FEC stack change sub- TLV) is carried in a DDM TLV of the echo reply, and a transmission node is asked not to carry FEC-A1 next time a request message is sent.

At S303, as the initiation node, the node S sends messages <A1, B1, BC1, D1><FEC-B1, FEC-BC1, FEC-D1>, and the TTL of the stack top label continues to be set as 1.

At S304, after the message is received by the node A, the message is sent to the control plane because the TTL is 1 and becomes 0 after one is subtracted from the TTL, and the verification flow is entered. The local entry of the node A is inquired, whether a prefix, a notification protocol and slice ID information related to label B1 are consistent with those of FEC B1 is determined, and a verification result message is returned through an echo reply.

At S305, as the initiation node, the node S sends messages <A1, B1, BC1, D1><FEC-B1, FEC-BC1, FEC-D1>, and the TTL of the stack top label is set as 2.

At S306, after the message is received by the node A, label A1 is removed according to a normal forwarding flow, and TTL-1 of the label A1 is copied onto the label B1; then the message is forwarded to node B according to the label B1; and after the message is received by the node B, the message is sent to the control plane because TTL-1=0, and the verification flow is entered. The node B is inquired. In addition, since the node B is the initiation node of prefix B1, in addition to a verification result, the echo reply carries the FEC stack change sub-TLV, and the transmission node is asked not to carry FEC-B1 next time a request is sent.

At S307, as the initiation node, the node S sends messages <A1, B1, BC1, D1><FEC-B1, FEC-BC1, FEC-D1>, and the TTL of the stack top label is set as 2.

At S308, after the message is received by the node A, label A1 is removed according to a normal forwarding flow, and TTL-1 of the label A1 is copied onto the label B1; then the message is forwarded to node B according to the label B1; and after the message is received by the node B, the message is sent to the control plane because TTL-1=0, and the verification flow is entered. The node B is inquired. In addition, since the node B is the initiation node of prefix B1, in addition to a verification result, the echo reply carries the FEC stack change sub-TLV, and the transmission node is asked not to carry FEC-B1 next time a request is sent.

At S309, as the initiation node, the node S sends messages <A1, B1, BC1, D1><FEC-BC1, FEC-D1>, and the TTL of the stack top label is set as 2.

At S310, after the message is received by the node A, messages <B1, BC1, D1><FEC-BC1, FEC-D1> are sent to the node B according to the normal forwarding flow.

At S311, the message is sent to the control plane because TTL-1=0 on the node B, and the verification flow is entered. According to contents in FEC STACK, whether a link, a notification protocol and slice ID information associated with BC1 in the local entry are consistent with those in FEC-BC1 is verified, and a verification result is returned.

At S312, as the initiation node, the node S sends messages <A1, B1, BC1, D1><FEC-BC1, FEC-D1>, and the TTL of the stack top label is set as 3.

At S313, the nodes A and B forward the message according to the normal forwarding flow, and the messages sent by the node B to a node C are <BC1, D1><FEC-BC1, FEC-D1>.

At S314, the message is sent to the control plane because label TTL received on the node C is 1, and the verification flow is entered. In addition, according to the provisions of RFC8287, the node C serves as a downstream node of link BC1. In addition to the verification result, the echo reply carries the FEC stack change sub-TLV, and the transmission node is asked not to carry FEC-BC1 next time a request is sent.

At S315, as the initiation node, the node S sends messages <A1, B1, BC1, D1><FEC-D1>, and the TTL of the stack top label is set as 3.

At S316, the nodes A and B forward the message according to the normal forwarding flow, and the messages sent by the node B to the node C are <BC1, D1><FEC-D1>.

At S317, the message is sent to the control plane because label TTL received on the node C is 1, the verification flow is entered, whether slicing and other information associated with SID D1 in the local entry are consistent with those in FEC-D1 is verified, and a verification reply message is returned.

At S318, as the initiation node, the node S sends messages <A1, B1, BC1, D1><FEC-D1>, and the TTL of the stack top label is set as 4.

At S319, the nodes A, B and C forward the message according to the normal forwarding flow, and the messages sent by the node C to a node D are <D1><FEC-D1>.

At S320, after the message is received by the node D, the message is sent to the control plane because TTL-1=0, and the verification flow is entered. Whether local slicing and other information associated with an SID are consistent with those in FEC-D1 is verified, and the verification result is returned through the verification reply message. Meanwhile, as indicated in the reply message, D is an exit of a path, such that the node S may complete the trace route flow for the entire LSP after reception.

The ordinary skilled person in the art should know that what are described above are illustration with an instance of copying TTL of a processed top label onto a lower label during forwarding. Therefore, an initial node controls which node may enter the verification flow after receiving the message by controlling the TTL of the top label. Another mode is that labels of each layer in the label stack keep their own TTL and are not influenced by labels of an upper layer. If the mode is used by each node on MPLS LSP, the TTL of each layer needs to be set according to demands when the verification message is sent.

In addition, although slice IDs on one slice path use a same value in the scenario embodiment, the slice Ids may be local identifiers. That is, different slice IDs are used on nodes of one slice path so as to identify slices.

Scenario Embodiment 4

The LSP PING mechanism further includes a function of specifying a reply path. The function may be used to specify the reply path, verify connectivity of the reply path, and verify a returned LSP. The embodiment explains how to specify the reply path as a specific slice-related path in the ping mode, and a related verification flow of return slice path information.

A transmission node sends a verification request message. A reply mode field (5 Reply via Specified Path) of an echo request indicates that a reply needs to be sent according to a specified path, and further carries a reply path (RP) TLV.

After the message is received by a destination node of Ping, whether any matched return path information is located is determined according to FEC information carried in the reply path (RP) TLV. If a corresponding MPLS return path is located, an echo reply message is packaged in a corresponding MPLS label stack so as to be returned. TTL of a top label is set as 255. The echo reply message carries the RP TLV reflecting the return path. If no corresponding return slice path is located according to an FEC, a return node may explain the condition in an echo reply, so as to notify a head node of the information.

After the message is received by the transmission node, an FEC verification flow may be conducted to verify whether the FEC information carried in the received RP TLV is consistent with local information. The verification flow is consistent with the FEC verification flow in a forward ping mode.

Figure 22:
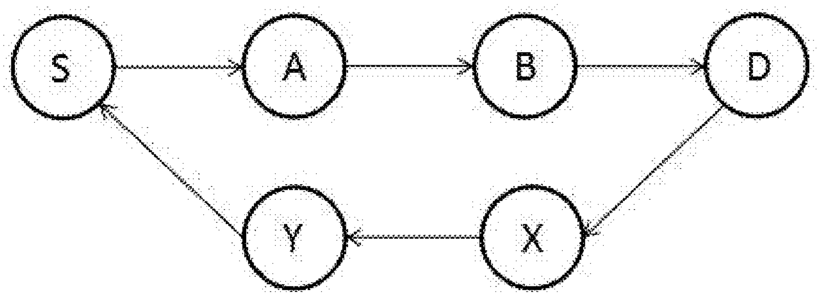
FIG. 22 is a schematic diagram of node networking of a specified reply path according to a scenario embodiment of the disclosure.

FIG. 22 is a schematic diagram of node networking of a specified reply path according to a scenario embodiment of the disclosure. As shown in FIG. 22, node A allocates a prefix SID related to slice 1 as SID A1 and a prefix SID related to slice 2 as SID A2 to prefix A of a loopback route; node B allocates a prefix SID related to slice 1 as SID B1 and a prefix SID related to slice 2 as SID B2 to prefix B of a loopback route; node D allocates a prefix SID related to slice 1 as SID D1 to prefix D of a loopback route; node X allocates a prefix SID related to slice 2 as SID X2 to prefix X of a loopback route; node Y allocates a prefix SID related to slice 2 as SID Y2 to prefix X of a loopback route; and node S allocates a prefix SID related to slice 2 as SID S2 to prefix S of a loopback route.

In the ping mode, the node S, as an initiation end, sends a verification request message so as to verify a certain path in the slice 1, and expects that a reply message returns via a specified path of the slice 2. Messages sent are <A1, B1, D1><FEC-TLV: FEC-D1><Reply Path TLV: FEC-X2, FEC-Y2, FEC-S2>.

The messages are described as follows:

An MPLS label stack includes A1, B1, D1, which correspond to MPLS labels of SID A1, SID B1 and SID D1, respectively.

A target FEC stack TLV carries a sub-TLV: FEC-D1. The FEC-D1 includes Prefix D and slice ID 1.

A reply path TLV carries sub-TLVs: FEC-X2, FEC-Y2, FEC-S2, and carries FEC information required to be passed on a return path. For instance, the FEC-X2 includes prefix X and slice ID2.

A flow from S to D and a verification flow on D are consistent with those in the ping mode, and will not be repeated herein.

After the node D receives an echo request for verification, the reply path TLV is included in the request message, which indicates that an echo reply needs to return via the specified slice path. FEC-X2, FEC-Y2 and FEC-S2 carry the FEC information required to be passed on the return path. The node D locates a corresponding SID value according to a prefix and slice ID information in the FEC information, such that the label stack corresponding to a corresponding slice return LSP is determined as <X2, Y2, S2>. (If the corresponding return path is not located according to the FEC, the reply may be returned via other reachable paths, and the condition is explained by a return code, such that a head node knows that a path where the FEC exists is not located on a tail node)

The node D packages a message, sets MPLS TTL of a stack bottom as 255 according to the ping mode, and carries the reply path TLV. <X2, Y2, S2><Reply Path TLV: FEC-B2, FEC-A2, FEC-S2>.

The node B and the node A forward the message according to a normal MPLS flow and forward the message to the node S.

The node S receives the message <S2><Reply Path TLV: FEC-B2, FEC-A2, FEC-S2>, whether a prefix and slice ID information in a local entry associated with S2 are consistent with those carried in FEC-S2 is verified according to an exit FEC verification flow of the ping mode, such that verification of a specified reverse slice path is completed.

It may be seen from the above scenario embodiments that the function may achieve the following objectives:

1) Whether a tail node has a path corresponding to an FEC provided in a request message is determined.
2) After a return LSP is determined according to an FEC, connectivity of the LSP is determined according to whether an initiation node may receive a return message.
3) An initiation node serves as an egress node of a return path, and whether information associated with a local entry of the initiation node is consistent with an FEC in a return message is verified.

It should be noted that for convenience of distinction, with two-way different paths belonging to slices as the instance, scenarios where paths belong to a same slice are also applicable, and a case of forward non-sliced paths is also applicable. In addition, the embodiment illustrates a scenario of two-way different paths, and is also applicable to a scenario of a common two-way path, that is, forward and backward paths pass same nodes.

Scenario Embodiment 5

In a case of a two-way path, a transmission node of an echo request may require a corresponding node to carry FEC information of a return path during replying. After reception of the transmission node, whether the return path satisfies expectation may be verified, and the return path may be one slice path.

Figure 23:
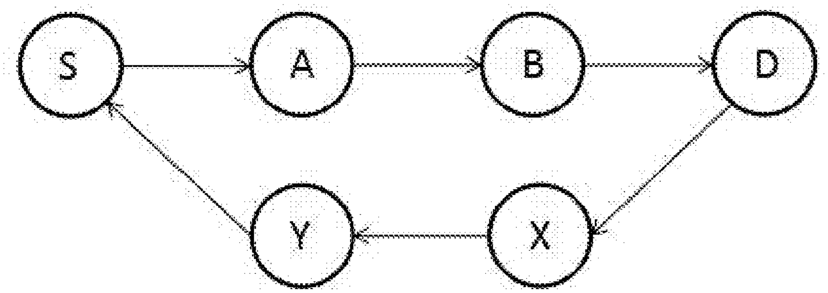
FIG. 23 is a schematic diagram of node networking of returning reverse slicing information to an initiation node according to a scenario embodiment of the disclosure.

FIG. 23 is a schematic diagram of node networking of returning reverse slicing information to an initiation node according to a scenario embodiment of the disclosure. As shown in FIG. 23, node A allocates a prefix SID related to slice 1 as SID A1 and a prefix SID related to slice 2 as SID A2 to prefix A of a loopback route; node B allocates a prefix SID related to slice 1 as SID B1 and a prefix SID related to slice 2 as SID B2 to prefix B of a loopback route; node D allocates a prefix SID related to slice 1 as SID D1 to prefix D of a loopback route; node X allocates a prefix SID related to slice 2 as SID X2 to prefix X of a loopback route; node Y allocates a prefix SID related to slice 2 as SID Y2 to prefix X of a loopback route; and node S allocates a prefix SID related to slice 2 as SID S2 to prefix S of a loopback route.

A two-way path (different from the above instance in that a return path of the two-way path is pre-determined), and a specified forward path sequentially passes S-A-B-C-D, which corresponds to slice 1. A reverse path is a path in slice 2, which sequentially passes D-C-B-A-S. The slice 1 and the slice 2 may be a same slice or not. The forward path may also be a non-sliced path.

The node S sends a verification request message, and sets R-FLAG in an echo request, which indicates that when a response node needs to return an echo reply, FEC information corresponding to the reverse path needs to be carried.

The node S sends messages <A1, B1, D1><FEC-TLV: FEC-D1>, and a forward verification flow is similar to that of the above instance, and will not be repeated herein.

After the node D receives the message, it is found that the R-FLAG in the echo request is set, so a reverse-path target FEC stack TLV needs to be carried in the echo reply. The sub-TLVs are sequentially carried in the TLV as follows: FEC-X2, FEC-Y2 and FEC-S2, and reflect the FEC information of the return path. Meanwhile, as the return path is specified in the two-way path scenario, the echo reply is sent by packaging the echo reply in the label stack <X2, Y2, S2>.

After the node S receives the message, the verification flow is entered because a destination IP of the message with S2 removed is in a range of 127/8, and whether the FEC information carried in the reverse-path target FEC stack TLV is consistent with the information associated with the local entry is verified through comparison, such that the entire flow is completed.

If an intermediate node of the path is expected, the mode is similar to the trace route mode in the scenario embodiment 3, and TTL needs to be set rationally, such that the verification flow is triggered on the node that is expected to be verified.

According to the above scenario embodiment, the disclosure provides a method for verifying slicing information, which may be configured for path detection and fault location in a slice based on SR-MPLS. The method mainly includes the following steps: a first message carrying slicing information to-be-verified is sent; and the first message is received, and the slicing information is verified. The scenarios to which the method is applicable may as follows: (1) MPLS LSP ping is used to detect connectivity of a slice path and verify slicing information on an egress node. (2) MPLS Traceroute is used to verify slicing information on each node of a slice path. (3) When an MPLS echo request is sent, a path of reply is specified as a specific slice path. A reply node packages a corresponding message according to specified information and replies to a transmission node, and the transmission node is used as an egress node of a reply path so as to verify slice correlation. (4) In a case of a two-way path, a corresponding node is required to carry FEC information of a return path during replying. In a case that the return path is a slice path, the FEC information of the slice path returned by the reply node is returned to the transmission node, and the node on the return path may verify related slicing information on the node.

What described above are merely preferred embodiments of the disclosure and are not intended to limit the disclosure, and those skilled in the art can make various modifications and changes to the disclosure. Any modifications, equivalent replacements, improvements, etc. made within the principles of the disclosure should fall within the protection scope of the disclosure.

What is claimed is:

1. A method for verifying slicing information, applied in a segment routing-multi-protocol label switching (SR-MPLS) network, comprising:

sending, by an initiation node, a first message, wherein slicing information to-be-verified is carried in the first message, such that a receiving node verifies whether the slicing information carried in the first message is consistent with local information of the receiving node;

wherein a multi-protocol label switching (MPLS) echo request or an MPLS echo reply is further carried in the first message;

wherein in a case that the MPLS echo request is carried in the first message, after sending the first message by the initiation node, the method further comprises:

receiving, by the initiation node, a second message returned by the receiving node according to a verification result, and determining the verification result according to the second message, wherein the second message comprises the MPLS echo reply.

2. The method according to claim 1, wherein in a case that the MPLS echo reply is carried in the first message, before sending the first message by the initiation node, the method further comprises:

receiving, by the initiation node, an MPLS echo request message.

3. The method according to claim 1, wherein in response to determining that the MPLS echo request is carried in the first message, sending, by an initiation node, the first message comprises:

sending, by the initiation node, the first message to an egress node; and receiving, by the initiation node, a second message returned by the egress node according to a verification result comprises:

receiving and determining, by the initiation node, the verification result from the egress node, wherein the verification result is that the egress node inquires an own local entry and verifies whether a slice identifier (ID) in a sub-type-length-value (sub-TLV) of a forwarding equivalence class (FEC) TLV is consistent with that in the local entry.

4. The method according to claim 1, wherein in response to determining that the MPLS echo request is carried in the first message, sending, by an initiation node, the first message further comprises:

sending, by the initiation node, the first message to the receiving nodes one by one, and triggering slicing information verification of each of the receiving nodes by an MPLS label of the slicing information to-be-verified, wherein the MPLS echo request comprises verifying a forwarding equivalence class (FEC) TLV, the FEC TLV comprises sub-TLV information and/or TLV information of downstream detailed mapping (DDM), and the sub-TLV information comprises first slicing information.

5. The method according to claim 2, wherein sending, by the initiation node, the first message comprises:

receiving, by the initiation node, the MPLS echo request message, wherein the MPLS echo request message comprises a reply path (RP) TLV, the RP TLV comprises forwarding equivalence class (FEC) information of a reply path, and the FEC information comprises first slicing information; and sending, by the initiation node, the first message through the reply path, wherein the reply path is located and matched by the receiving node according to the FEC information, the first message comprises an MPLS label stack and an MPLS echo reply corresponding to the reply path, and the MPLS echo reply comprises the RP TLV.

6. The method according to claim 2, wherein sending, by the initiation node, the first message further comprises:

receiving, by the initiation node, an MPLS echo request message, and setting an R identifier in the MPLS echo request message; and sending, by the initiation node, the first message, wherein a reverse path target forwarding equivalence class stack TLV is carried in the MPLS echo reply of the first message, and first slicing information is carried in the reverse path target forwarding equivalence class stack TLV.

7. A method for verifying slicing information, used in a segment routing-multi-protocol label switching (SR-MPLS) network, comprising:

receiving, by a receiving node, a first message sent by an initiation node, and verifying whether the slicing information carried in the first message is consistent with local information of the receiving node;

wherein a multi-protocol label switching (MPLS) echo request or an MPLS echo reply is further carried in the first message;

wherein in a case that the MPLS echo request is carried in the first message, after verifying, by the receiving node, whether the slicing information carried in the first message is consistent with local information of the receiving node, the method further comprises:

returning, by the receiving node, a second message to the initiation node, such that a verification result is determined by the initiation node, wherein the second message comprises the MPLS echo reply.

8. The method according to claim 7, wherein the receiving node verifies whether the slicing information carried in the first message is consistent with the local information of the receiving node by satisfying a triggering condition, wherein the triggering condition comprises at least one of the following conditions:

a router alert option comprised in an internet protocol (IP) header;

IP time to live (TTL) expiration;

MPLS time to live (TTL) expiration;

a label being an MPLS router alert label; and a destination IP being within a range of 127/8.

9. The method according to claim 7, wherein in response to determining that the MPLS echo request is carried in the first message, receiving, by the receiving node, the first message sent by the initiation node further comprises:

allocating, by the receiving node, a segment identifier associated with first slicing information; and locally generating, by the receiving node, a mapping entry between the segment identifier and the first slicing information; and verifying, by the receiving node, whether the first slicing information is consistent with local information of the receiving node comprises:

inquiring, by the receiving node, an own local entry according to the first message, verifying whether a slice ID in sub-TLV information of a forwarding equivalence class (FEC) TLV is consistent with that in the local entry; and returning, by the receiving node, a verification result to the initiation node, such that the initiation node confirms the verification result, and determines whether the first slicing information is verified.

10. The method according to claim 7, wherein in response to determining that the MPLS echo request is carried in the first message, receiving, by the receiving node, the first message sent by an initiation node further comprises:

allocating, by the receiving node, a segment identifier associated with first slicing information; and locally generating, by the receiving node, a mapping entry between the segment identifier and the first slicing information; and verifying, by the receiving node, whether the first slicing information is consistent with local information of the receiving node comprises:

triggering, by the receiving node, slicing information verification of each of the receiving nodes according to an MPLS label of the slicing information to-be-verified in the first message, wherein the MPLS echo request comprises verifying a forwarding equivalence class (FEC) TLV, the FEC TLV comprises sub-TLV information and/or TLV information of downstream detailed mapping (DDM), and the sub-TLV information comprises the first slicing information.

11. The method according to claim 7, wherein in response to determining that the MPLS echo reply is carried in the first message, receiving, by the receiving node, the first message sent by an initiation node further comprises:

receiving, by the receiving node, the first message sent by the initiation node through a reply path, wherein the reply path is located and matched by the receiving node according to forwarding equivalence class (FEC) information, the first message comprises an MPLS label stack and an MPLS echo reply corresponding to the reply path, the MPLS echo reply comprises an RP TLV, the RP TLV comprises the FEC information of the reply path, and the FEC information comprises first slicing information.

12. The method according to claim 7, wherein the receiving, by the receiving node, the first message sent by an initiation node further comprises:

receiving, by the receiving node, the first message, wherein a reverse path target forwarding equivalence class stack TLV is carried in the MPLS echo reply of the first message, and first slicing information is carried in the reverse path target forwarding equivalence class stack TLV.

13. An apparatus for verifying slicing information, used in a segment routing-multi-protocol label switching (SR-MPLS) network, comprising:

an initiation node, configured to send a first message, wherein slicing information to-be-verified is carried in the first message, such that a receiving node verifies whether the slicing information carried in the first message is consistent with local information of a receiving node;

wherein a multi-protocol label switching (MPLS) echo request or an MPLS echo reply is further carried in the first message;

wherein in a case that the MPLS echo request is carried in the first message, after sending the first message by the initiation node, the initiation node is further configured to receive a second message returned by the receiving node according to a verification result, and determine the verification result according to the second message, wherein the second message comprises the MPLS echo reply.

14. A non-transitory computer-readable storage medium, storing a computer program, wherein the computer program is configured to, when executed by a processor, implement the method as claimed in claim 1.

15. An electronic apparatus, comprising a memory, a processor, and a computer program stored in the memory and executable on the processor, wherein the processor is configured to execute the computer program to implement the method as claimed in claim 1.

* * * * *